United States Patent
Gehrling et al.

(10) Patent No.: US 9,949,107 B2
(45) Date of Patent: Apr. 17, 2018

(54) METHOD AND SYSTEM FOR DETECTING AN INPUT TO A DEVICE

(71) Applicant: VOLKSWAGEN AKTIENGESELLSCHAFT, Wolfsburg (DE)

(72) Inventors: Sebastian Gehrling, Essen (DE); Klaus Meierling, Bochum (DE); Gerd Penshorn, Edemissen (DE); Wolfgang Theimer, Bochum (DE); Jens Kampermann, Haan (DE); Matthias Mohaupt, Bochum (DE); Henning Taschke, Bochum (DE); Ernst Zielinski, Bochum (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/428,016

(22) Filed: Feb. 8, 2017

(65) Prior Publication Data

US 2017/0230812 A1 Aug. 10, 2017

(30) Foreign Application Priority Data

Feb. 8, 2016 (DE) ........................ 10 2016 201 845

(51) Int. Cl.
*H04W 8/00* (2009.01)
*G06F 3/01* (2006.01)
(Continued)

(52) U.S. Cl.
CPC ............ *H04W 8/005* (2013.01); *G06F 3/017* (2013.01); *H04W 4/023* (2013.01); *H04W 4/027* (2013.01); *H04W 4/046* (2013.01)

(58) Field of Classification Search
CPC ....................................................... H04W 4/027
See application file for complete search history.

(56) References Cited

U.S. PATENT DOCUMENTS 5,781,663 A * 7/1998 Sakaguchi ........... G06K 9/6807
382/186
9,097,800 B1 * 8/2015 Zhu ........................ G01S 13/865
(Continued)

FOREIGN PATENT DOCUMENTS

CN 202584010 12/2012
DE 102011116312 A1 4/2012
(Continued)

OTHER PUBLICATIONS

German Patent Appln. No. 10 2016 201 845.0. Applicant: Volkswagen Aktiengesellschaft. Search Report dated Aug. 9, 2016.

*Primary Examiner* — Hsin-Chun Liao
(74) *Attorney, Agent, or Firm* — Loza & Loza, LLP; Peter Zura

(57) ABSTRACT

System and method for detecting an input for an apparatus inside a vehicle, wherein at least one moving user device generates a changing electromagnetic field. A detection unit detects at least one field parameter of the electromagnetic field, wherein the detected field parameter is a function of the geometric arrangement of the user device relative to the detection unit. A radio signature of the user device is determined based on the detected field parameters, and a signature sequence is determined based on a sequence of time-sequentially determined radio signatures of the user device. The determined signature sequence is then assigned to an input gesture, and whereby, based on the input gesture, a signal is generated and output.

20 Claims, 1 Drawing Sheet

(51) Int. Cl.
*H04W 4/02* (2018.01)
*H04W 4/04* (2009.01)

(56) References Cited

U.S. PATENT DOCUMENTS

| | | |
|---|---|---|
| 2008/0136775 A1 | 6/2008 | Conant |
| 2011/0310013 A1 | 12/2011 | Ryoo et al. |
| 2012/0293410 A1 | 11/2012 | Bell |

FOREIGN PATENT DOCUMENTS

| | | |
|---|---|---|
| DE | 102013226682 A1 | 6/2015 |
| WO | WO2015138448 A1 | 9/2015 |

* cited by examiner

METHOD AND SYSTEM FOR DETECTING AN INPUT TO A DEVICE

RELATED APPLICATIONS

The present application claims priority under 35 U.S.C. § 119 to German Patent Application No. 10 2016 201 845.0, filed Feb. 8, 2016 to Gehrling et al., the contents of which is incorporated by reference in its entirety herein.

TECHNICAL FIELD

The present disclosure relates to a method and a system for detecting an input for an apparatus, such as a vehicle.

BACKGROUND

Using gestures to operate electronic apparatuses can result in substantial improvements in terms of operability and comfort, especially in contrast to conventional modalities that involve switches, controllers and buttons on touch screens. In particular, a plurality of electronic devices are envisioned for use inside a vehicle, and their operation should make it possible for the driver or another passenger alike to control operation, while only minimally distracting the driver from the surrounding traffic. The benefits of gesture control therefore lends itself particularly well to utilization in this field.

Tracking the position and motion of the actuation object, such as the hand of the user, is possible for detecting a gesture. This can be achieved, for example, by means of a camera system or ultrasonic sensors. Further, equipping the actuation object itself with sensors that measure any motion and transmit the detected data to the input system has been proposed.

For example, CN 202584010 U describes a gesture detection system that is fastened to the wrist of the user and that detects and transmits data, such as speeds and angles of inclination.

DE 10 2013 226 682 A1 describes a wrist band sensor and a method for operating said wrist band sensor. The wrist band sensor therein is worn around the arm from where it detects the posture and/or the position of a hand relative to the arm and to the wrist band, respectively. These data are transmitted and the hand signals analyzed, particularly in order to operate a transmission of a vehicle.

US 2012/0293410 A1 describes an input device that is designed as a wearable ring. The wearable ring includes a touch pad on the external surface thereof. Inputs can be entered via the touch pad and are then transmitted via radio. Moreover, it is possible to transmit an acceleration signal by radio, such that gestures that are performed by the hand can also be recognized.

US 2011/0310013 A1 describes a device that enables an actuation of touchless input. To this end, a wrist-band-like device is affixed to the wrist of the user. An interface comprises proximity sensors for detecting a hand motion performed by the user relative to the wrist band and an inertial reference sensor serves for detecting a motion of the arm of the user.

Finally, DE 10 2011 116 312 A1 describes an input device that is worn in the manner of a piece of clothing or an accessory and equipped with displacement and/or acceleration sensors. Based on the data as detected by these sensors, a gesture is recognized and a functionality of a device assigned to this gesture is activated.

BRIEF SUMMARY

The present disclosure is directed to providing a method and a system to enable simplified operation and requiring only minimal additional efforts for the user.

In some illustrative embodiments a system may be configured such that at least one moving user device generates a changing electromagnetic field. Using the detection unit, at least one field parameter of the electromagnetic field is detected, wherein the detected field parameter is a function of the geometric arrangement of the user device relative to the detection unit. Using the detected field parameter, a radio signature of the user device is determined and, using a sequence of time-sequentially determined radio signatures of the user device, a signature sequence is determined. The determined signature sequence is then assigned an input gesture and, moreover, a signal is generated and output based on the input gesture.

Advantageously, this enables detecting an input based on a user device, wherein the user device may not be specifically designed for said purpose of gesture-driven operation under an illustrative embodiment. In particular, a motion of the user device can be detected and analyzed. The input therein comprises, in particular, an input gesture that serves for generating and outputting a signal.

Moreover, the use of a special actuation object is not required for performing the input gesture; instead, devices that are already enjoying widespread use and have the capability of transmitting radio signals can be used, such as e.g., a mobile telephone, smartwatch or fitness wrist band. The electromagnetic field is generated by conventional means, such as via a Bluetooth connection, or the like. Moreover, utilizing the electromagnetic field of a transmitting user device facilitates gesture detection even without a direct visual connection, which is especially advantageous, in particular, considering the often tight spaces inside a vehicle.

In some illustrative embodiments, the detected field parameter can be, for example, wave length, propagation direction, amplitude, polarization and/or phase, wherein different field components, such as, e.g., the electric and magnetic fields, can be considered separately from or in connection with each other. In particular, a plurality of parameters may be detected, wherein this helps in executing the technology in a more robust fashion. The detected field parameter may be a function of the geometry of the arrangement of the user device and the detection unit. It is possible, for example, to configure a plurality of detection units that enable detecting the field parameter at different locations. Based on the field parameter, a radio signature is determined, such as, e.g., Received Signal Strength Indication (RSSI) values. The radio signature signifies, in particular, the totality of the field parameters at a given location and represents a position in space, wherein, based on the radio signature, it is possible to determine, in particular, the position of the user device.

Known methods are used for the detection step. Further, the user device that generates the electromagnetic field can be tracked in ways that are known in the art. The field parameter or radio signature of the user device may be time-sequentially detected multiple times under illustrative embodiments. This way, it is possible to follow, for example, a motion by the user device.

BRIEF DESCRIPTION OF THE DRAWINGS

The present disclosure will be further explained below based on embodiments in reference to the drawings.

DETAILED DESCRIPTION

Figure 1:
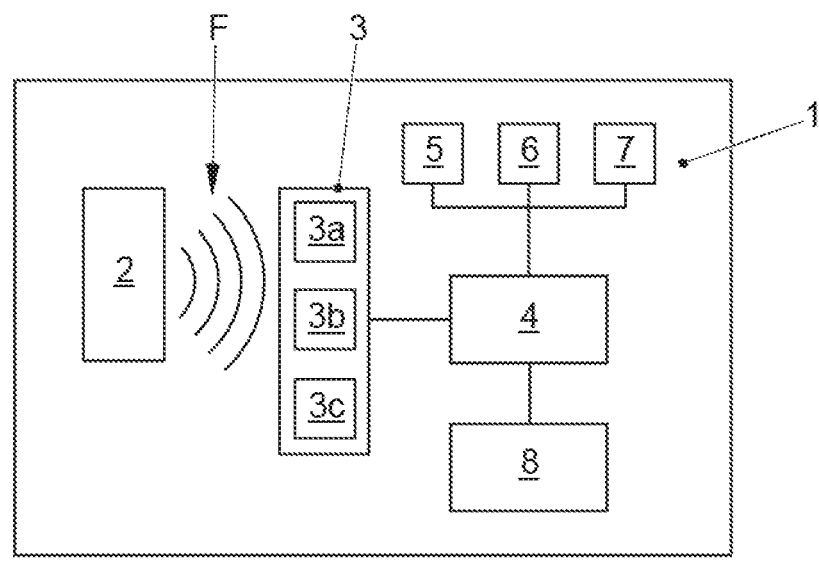
FIG. 1 shows a vehicle equipped with an embodiment of the system according to an illustrative embodiment.

An "input gesture" according to the invention is understood as a certain position of an actuation object or a certain motion that is performed with the actuation object. Under an illustrative embodiment, the actuation object may be a user device that generates the electromagnetic field. The input gestures can be configured according to those known in the art. These comprise, for example, point gestures, swipe gestures and combinations of several such gestures that are performed in quick succession, if necessary.

The input gestures can be performed in a detection space or area, where input gestures are detected. By utilizing an electromagnetic field, this detection space can be very large comprising, for example, the entire interior of the vehicle. The detection space may also be defined in that input gestures that are detected in certain areas are assigned to a certain function, such as, e.g., the operation/function of an apparatus. In some illustrative embodiments, the detection space is not limited by conditions such as free visibility relative to a detector, which may be the case if input gestures are detected by means of a camera. The detection space can be limited, for example, by the technical detection range of the used detection device or by devices that shield against electromagnetic radiation.

According to some illustrative embodiments, the input gesture is determined based on time-sequentially determined radio signatures of the user device, wherein, based on these signatures, a signature sequence may be determined. The signature sequence may characterize a motion path which the user device follows, which may represent its trajectory. The trajectory therein can be explicitly determined based on a plurality of positions of the user device detected in a time-sequential fashion. Moreover, the trajectory can be implicitly detected by using the signature sequence but without determining a position in space. In particular, it is possible this way to detect a gesture independently of where said gesture is performed inside the detection space.

In some illustrative embodiments, using the signature sequence based on a certain trajectory, it is further possible to determine a motion direction. In particular, the motion direction can be coupled directly to an operable apparatus, such as when a controllable motion element that is displayed, e.g., in a display area is operated by the input gesture. In this case, the motion that is performed during the input gesture moves the motion element on the display area. The motion element can be, for example, a sliding or rotary switch that is represented on the display area. A motion element of this kind can be actuated by a motion of an input gesture that corresponds to a sliding or rotary action of the motion element, wherein the corresponding motion is a touch-free motion that the user performs in the detection space. Actuating a motion element in this manner, which may be indicated on the display area, offers the advantage that the user is not obliged to hit a certain portion of the area, as is the case, e.g., with a touch-sensitive surface. Rather, performing the input gesture that is assigned to the motion element in the desired direction is sufficient. The input gesture therein corresponds, in particular, to a motion that is performed, for example, on mechanical operating elements thus helping the user to easily remember said input gesture.

The output of the signal that is generated based on the input gesture occurs in such a way, in particular, that it serves to control an apparatus or a function of the apparatus. For example, this can be an apparatus of the vehicle, but also a function of the user device or an apparatus disposed externally of the vehicle.

Apparatuses that are connected to the vehicle by a technically separable connection, may be understood as "external of the vehicle", meaning, while they do not constitute a component of the vehicle, they can nevertheless be controlled or operated from the vehicle. Opening a garage, for example, can be effected by means of a remote control device from inside the vehicle, and the method according to some illustrative embodiments enables such an operation when the suitable input gestures are performed. Moreover, it is possible to operate further apparatuses in a so-called "Smart Home" environment, such as in preparation of the arrival of the user in his or her home.

In particular, when performing the input gesture for the apparatus that is to be operated, it is not necessary for the user to approach the same. Due to the control action by means of input gestures, the user is therefore provided with a particularly simple and intuitive input option for control.

Under the present disclosure, the changing electromagnetic field may comprise identifying data of the user device. Said identification data are generated and transmitted through the electromagnetic field in a manner that is known in the art. Advantageously, it is therefore possible for input gestures to be only accepted by a specific user device or differentiated thereof, which user device describes a certain trajectory.

This way, it is possible to operate, for example, specific apparatuses by means of specific user devices; different users can be assigned different credentials for operating the individual functions. Alternately or in addition, different trajectories can be defined for input gestures, depending on which user device is describing the trajectory. This facilitates individualized configurations of the method according to the invention for different users and/or user devices.

In a further implementation, an activation signal may be detected, whereby the detection of the input is achieved by means of the activation signal. Advantageously, the gesture detection can thus be activated at specific times, for example in order to avoid the process of gesture detection in situations when the user moves the user device without operating intent.

In some illustrative embodiments, the activation signal may be detected by a voice input from a user. Advantageously, this facilitates activating the gesture control quickly and simply. The user can, for example, trigger the activation signal by verbalizing a voice command. In doing so, it is further possible to achieve integration into an operating concept, in particular of a vehicle that also comprises a voice control.

In some illustrative embodiments, the activation signal can be generated according to known methods, wherein, in particular, an operating action by the user is detected, and/or the generation of an activation signal is triggered automatically.

In one illustrative embodiment, a position of the user device is determined based on the radio signature. In particular, a triangulation procedure can be used to accomplish this. This method advantageously enables simple and precise position finding of the user device, such as for determining a trajectory based upon which a gesture can be explicitly recognized. For example, several detector units can be disposed at intervals in the interior of a vehicle, wherein, based on the signals that are detected by the individual detector units, it is possible to determine the position of the user device.

Moreover, other suitable radio position finding methods can also be used, wherein, if necessary, a component of the spatial position, such as a distance, can be determined. Moreover, for example, RSSI values can be used for detecting the signals of an electromagnetic field by means of antennas to determine the position of the user device.

In some illustrative embodiments, a speed and/or acceleration of the user device is also determined, and the signal is generated based on the determined speed and/or acceleration of the user device. Advantageously, this will allow for the possibility of considering the dynamic performance of the input gesture in addition to the motion path.

For example, the user can perform an input gesture quickly or slowly, thereby inputting, for example, an intensity or speed parameter. This can allow for a differentiated control where an input gesture that is performed slowly facilitates a fine setting, while an input gesture that is performed quickly facilitates a rough setting.

In one illustrative embodiment, the determined signature sequence is assigned to the input gesture based on a sequence comparison with a set of hypotheses. Advantageously, this enables a simple recognition of the input gesture.

For example, the set of hypotheses can comprise the quantity of all potentially recognizable input gestures, in particular in a parameterized form, such that the assignment of a specific signature sequence can be easily implemented. The set of hypotheses therein can comprise a quantity of reference sequences and/or reference trajectories and can be prescribed or configurable, for example via user inputs or by learning new input gestures.

In one implementation, the set of hypotheses is determined based on a current context. This way, the set of hypotheses can advantageously be adapted to the current situation, for example a driving state of the vehicle or the activity of specific operable apparatuses.

The current context can be determined, for example, based on data that comprise information concerning the current, past or forecast motion of the vehicle. Moreover, to determine context, it is possible to detect which apparatuses of the vehicle are activated or operable, which further apparatuses can be selected and/or which functions are currently executed by operable apparatuses, such as, for example, which programs are currently being executed by a computer. The set of hypotheses can then be adapted in such a way that the potentially recognizable input gestures are adapted to the current situation of the system. It is further possible to provide a customized set of hypotheses for a specific user device or a specific user.

In some illustrative embodiments, a similarity value is determined in the context of the sequence comparison; the similarity value is compared to the acceptance threshold value. This advantageously helps to establish the minimum level of reliability required for the recognition of the input gesture to ensure that the signal is generated and/or output.

The similarity value therein is determined according to known methods, in particular relative to assigning the input gesture to the specific signature sequence. The similarity value indicates the level of precision by which the determined signature sequence corresponds to an element of the set of hypotheses, meaning the level of certainty by which the input gesture has been recognized. The acceptance threshold value can be statically defined or dynamically determined, such as, for example, as a function of context, user preferences and/or criticality of the operable apparatus. For example, the requirements for similarity values concerning input gestures that serve to operate apparatuses in the vehicle with relevance for safety of the vehicle can be higher. Furthermore, the acceptance threshold value can be determined based on a user input, such as, e.g., a setup parameter.

In one illustrative embodiment, an activation signal serves to transmit a request signal to the user device. The user device generates the electromagnetic field based on the request signal. In particular, the electromagnetic field therein can include a specific characteristic.

Advantageously, this enables controlling the generation of the electromagnetic field by means of the user device, as needed. This means, in particular, that the electromagnetic field does not have to be generated continuously; instead, it can be requested as needed. It can be detected, for example, that an operation by means of an input gesture is possible, or an intention on the part of the user to provide input can be detected. This can be achieved, in particular, using the activation signal as described above.

The electromagnetic field can also be generated as a function of the request signal by the user device, for example, as a reply to a request posed to the user device. In particular, this way, it is possible to transmit user data, such as identifying data concerning the user device or the user. Furthermore, it is possible to transmit signals in such a manner via the electromagnetic field that facilitate particularly advantageous position finding.

In some illustrative embodiments, a system is disclosed comprising at least one moving user device by which a changing electromagnetic field can be generated and transmitted. It further comprises a detection unit with the capability of detecting at least one field parameter of the electromagnetic field, wherein the detected field parameter is a function of the geometric arrangement of the user device relative to the detection unit. A signature determination unit may be configured with the capability of determining a radio signature of the user device based on the detected field parameter, as well as a computing unit with the capability of determining a signature sequence based on radio signatures of the user device as determined using a sequence of time-sequential radio signatures. An assignment unit may be configured to assign an input gesture to a specific signature sequence, and a control unit is able to generate and output a signal based on the input gesture.

Under an illustrative embodiment, the moving user device may be fastened in the manner of a wrist band, in particular a smartwatch, around an extremity of the user. Furthermore, the use of electronic devices, such as, for example, a fitness wrist band or a mobile telephone is possible.

This way, the capability of producing an electromagnetic field that is typically present in such devices is advantageously utilized for detecting an input that is effected by an input gesture. Moreover, the use of a user device that is specialized for executing the method according to the present disclosure is also possible.

When the user device is fastened to an extremity of the user, for example positioned on the wrist or leg, it is not necessary to manually pick up the user device in order to perform an input gesture. Particularly inside a vehicle this has the advantage that the user does not have to pick up the user device but is instead able to perform the input gesture directly and without distraction.

In a further implementation, the detection unit comprises at least three antenna arrays that are spatially separated from one another. Advantageously, this allows for a determination of several radio signatures of the user device and of the plurality of antenna arrays, as well as, in particular, precise position finding for the user device.

In one embodiment, the signal that can be output to the moving user device can be transmitted to an apparatus of a vehicle and/or to an apparatus that is outside of the vehicle. Advantageously, this facilitates the operation of functions of different apparatuses.

In a further embodiment, the changing electromagnetic field can be actively or passively generated by the user device. Advantageously, this allows for the use of different types of user devices for gesture detection. As explained previously, the electromagnetic field of an active sender can be used that is able to independently generate the electromagnetic field, e.g. a smartwatch, fitness wrist band or mobile telephone. However, the generation can also be induced externally, such as by passive Radio Frequency IDentification (RFID) transponders, in which case an externally applied electromagnetic field results in the output of a radio signal.

Referring to FIG. 1, an embodiment of the system is disclosed under the present disclosure.

In this example, a user device 2 may be configured to generate a changing electromagnetic field F inside vehicle 1. In the depicted example, this may include a smartwatch of a user, meaning a wrist watch worn as a device around the wrist of the user and having the capability, in particular, of electronic data processing and communication with other data processing devices via radio. In this example, the user device 2 is uniquely assigned to a user. Bluetooth is utilized, in particular, for the transmission of data. A further embodiment utilizes a passive generation of an electromagnetic field by means of the user device 2, in particular via RFID.

Vehicle 1 further comprises a detection device 3 having detection units 3a, 3b, 3c. The detection device 3 is coupled with a control unit 4, which is, in turn, coupled with a signature determination unit 5, a computing unit 6, an assignment unit 7 and an apparatus 8. In the depicted embodiment, the apparatus 8 of vehicle 1 is a radio 8.

Figure 2:
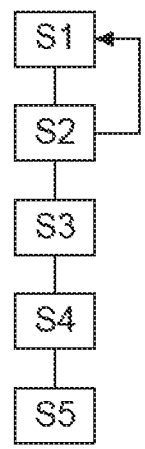
FIG. 2 shows an embodiment of a method according to an illustrative embodiment.

Referring to FIG. 2, a method according to an illustrative embodiment will be explained below, with reference to the embodiment of the system explained above, in FIG. 1.

In step S1, the user device 2 transmits data, in particular wireless, via a changing electromagnetic field F. The data in this example may comprise identification data of the user device 2 allowing for a unique identification of the user device 2 and the associated user thereof. In the case as described, the assumption is being made that there exists a longer lasting technical data connection of the user device 2 with the vehicle 1 and that the electromagnetic field F is substantially generated continuously by user device 2. In a further embodiment, a request signal is generated, alternatively or additionally, and transmitted to user device 2. The user device 2 then generates the electromagnetic field F as a function of the request signal. The electromagnetic field F therein is generated, in particular, in such a way that it is particularly well suited for position finding tasks.

In step S2, the electromagnetic field F is detected by the antenna arrays 3a, 3b, 3c of the detection device 3, wherein particularly the transmitted data and the different field parameters of the electromagnetic field F, as well as the RSSI radio signatures for all antenna arrays 3a, 3b, 3c are detected. In particular, the field parameters are detected in such a way that the signature determination unit 5 is able to determine based thereon a radio signature of the transmitting user device 2 utilizing methods that are known in the art.

Based on the radio signature of the user device 2 as determined by the signature determination unit 5, a position of the user device 2 is determined in the present embodiment using coordinates relative to the antenna arrays 3a, 3b, 3c. This means, in particular, that a triangulation is performed, or that the antenna arrays 3a, 3b, 3c analyze detected radio signatures in order to determine the position of the user device 2.

In a further embodiment, the detection device 3 may not be activated until the activation signal has been received. For example, issuing a voice command, the user can activate the gesture control, which results in an activation signal being generated. Moreover, apparatuses 8 of vehicle 1 or individual functions of said apparatuses 8 can generate the activation signal. In this case, the request signal as explained above can be generated, alternatively or additionally, and transmitted to the user device 2. If the electromagnetic field of the user device is generated passively, the same can be generated after the activation signal has been received.

The generation of field S1 and detection and position finding S2 may be continuously repeated in brief time intervals in the system, under one illustrative example.

In step S3, the computing unit 6 determines a trajectory of the user device 2. This is achieved using radio signatures that are time-sequentially determined and serve as the basis for determining a signature sequence. Since, in the embodiment, the radio signatures are used to determine the respective positions of the user device 2, a trajectory is also determined. The trajectory therein comprises data concerning a motion path that the user device 2 has traversed over the course of a certain time period and during which a number of positions were continuously sequentially determined. The number of positions for the determination of a trajectory can be statically defined or variably determined, for example in order to be able to detect input gestures lasting varying amounts of time.

In a further embodiment, the computing unit additionally detects a speed and/or acceleration of the user device 2 while moving along the trajectory.

In a fourth step S4, the assignment unit recognizes the input gesture based on the trajectory, if necessary, also based on the speed and/or acceleration of the user device 2. A current context is determined for the depicted example, wherein it is taken into account, in particular, which apparatuses 8 of the vehicle can currently be operated by means of gestures. Using the current context, a set of hypotheses representing reference values are determined that comprise, in particular, a "gesture vocabulary" of reference trajectories for all input gestures that can be potentially recognized and interpreted.

Based on the detected trajectories, one of the input gestures of the set of hypotheses (reference values) and an associated similarity value are determined. The similarity value indicates therein the probability by which the trajectory should be assigned to the recognized input gesture. Further, a review is done to ascertain as to whether the similarity value exceeds an acceptance threshold value and the input gesture is evaluated as being sufficiently safe only if this is the case.

In step S5, using the recognized input signal, a signal is generated and transmitted to the apparatus 8 of vehicle 1, which is in the presence instance radio 8. For example, the user can adjust the volume of the radio 8 by performing a motion with the user device 2 in a certain direction.

The various embodiments as described herein relate to the explicit recognition of a gesture on the basis of a trajectory for which several positions of the user device 2 have been determined over the course of a time sequence. Alternatively or additionally to the above, it is possible to perform an implicit recognition of the gesture, wherein the concrete position of the user device 2 is not determined. Instead, the set of hypotheses therein comprises a quantity of reference sequences of radio signatures that correspond to an input gesture. In particular, this can accelerate and simplify the method because no calculations for specifying the position must be performed.

LIST OF REFERENCE SIGNS

1 Vehicle
2 User device
3 Detection device
3a, 3b, 3c Detection units, antenna arrays
4 Control unit
5 Signature determination unit
6 Computing unit
7 Assignment unit
8 Apparatus; radio
F Electromagnetic field
S1 Field generation
S2 Detection and position finding
S3 Trajectory determination
S4 Assignment
S5 Signal generation and output

The invention claimed is:

1. A system for detecting a user input for a vehicle, comprising:
   a detection unit, operable to detect at least one parameter of a variable electromagnetic field produced by a portable device, wherein the at least one parameter of the electromagnetic field is a function of a geometric arrangement of the portable device relative to the detection unit during production of the variable electromagnetic field;
   a signature determination unit, operatively coupled to the detection unit, the signature detection unit being operable to determine one or more radio signatures of the user device based on the at least one detected parameter;
   a computing unit, operatively coupled to the signature determination unit, the computing unit being operable to determine a signature sequence for the portable device based on the one or more radio signatures of the user device using time-sequenced radio signatures;
   an assignment unit, operatively coupled to the computing unit, for at least one of assigning and/or identifying an input gesture to the time-sequenced radio signatures, wherein the assignment unit is configured to generate one or more similarity values based on a comparison of the time-sequenced radio signatures to one or more reference radio signatures, and assign and/or identify the input gesture if the similarity values meet or exceed one or more predetermined thresholds; and
   a control unit, operatively coupled to the assignment unit, for generating and outputting a signal based on the input gesture.

2. The system of claim 1, wherein the detection unit is operable to receive and process an activation signal prior to detecting the at least one parameter of the variable electromagnetic field produced by the portable device.

3. The system of claim 1, wherein the detection unit is operable to process identification data for the portable device received via the variable electromagnetic field.

4. The system of claim 1, wherein the computing unit is operable to determine one or more positions of the portable device based on the one or more radio signatures.

5. The system of claim 1, wherein the computing unit is operable to determine at least one of a speed and/or acceleration of the portable device from the one or more parameters, and wherein the control unit is operable to generate and output the signal based on the determined speed and/or acceleration.

6. The system of claim 1, wherein the signal comprises a control signal to control a function of a vehicle apparatus and/or an external apparatus associated with a vehicle.

7. The system of claim 1, wherein the portable device comprises one of a smart watch or a mobile telephone.

8. A method for detecting a user input for a vehicle, comprising:
   detecting, via a detection unit, at least one parameter of a variable electromagnetic field produced by a portable device, wherein the at least one parameter of the electromagnetic field is a function of a geometric arrangement of the portable device relative to the detection unit during production of the variable electromagnetic field;
   determining, via a signature determination unit, one or more radio signatures of the user device based on the at least one detected parameter;
   determining, via a computing unit, a signature sequence for the portable device based on the one or more radio signatures of the user device using time-sequenced radio signatures;
   at least one of assigning and/or identifying, via an assignment unit, an input gesture based on the time-sequenced radio signatures;
   generating one or more similarity values based on a comparison of the time-sequenced radio signatures to one or more reference radio signatures, and assigning and/or identifying the input gesture if the similarity values meet or exceed one or more predetermined thresholds; and
   generating and outputting, via a control unit, a signal based on the input gesture.

9. The method of claim 8, further comprising receiving and processing an activation signal prior to detecting the at least one parameter of the variable electromagnetic field produced by the portable device.

10. The method of claim 8, further comprising processing, via the detection unit, identification data for the portable device received via the variable electromagnetic field.

11. The method of claim 8, further comprising determining, via the computing unit, one or more positions of the portable device based on the one or more radio signatures.

12. The method of claim 8, further comprising determining, via the computing unit, at least one of a speed and/or acceleration of the portable device from the one or more parameters, and generating and outputting the signal based on the determined speed and/or acceleration.

13. The method of claim 8, wherein the signal comprises a control signal to control a function of a vehicle apparatus and/or an external apparatus associated with a vehicle.

14. The method of claim 8, wherein the portable device comprises one of a smart watch or a mobile telephone.

15. A system for detecting a user input for a vehicle, comprising:
   a detection unit, operable to generate and transmit a detection signal to a portable device for producing a variable electromagnetic field, wherein the detection unit is configured to detect at least one parameter of the produced variable electromagnetic field, wherein the at least one parameter of the electromagnetic field is a function of a geometric arrangement of the portable device relative to the detection unit during production of the variable electromagnetic field;

a signature determination unit, operatively coupled to the detection unit, the signature detection unit being operable to determine one or more radio signatures of the user device based on the at least one detected parameter;

a computing unit, operatively coupled to the signature determination unit, the computing unit being operable to determine a signature sequence for the portable device based on the one or more radio signatures of the user device using time-sequenced radio signatures;

an assignment unit, operatively coupled to the computing unit, for at least one of assigning and/or identifying an input gesture to time-sequenced radio signatures, wherein the assignment unit is configured to generate one or more similarity values based on the comparison of the time-sequenced radio signatures to one or more reference radio signatures, and assign and/or identify the input gesture if the similarity values meet or exceed one or more predetermined thresholds; and a control unit, operatively coupled to the assignment unit, for generating and outputting a signal based on the input gesture.

16. The system of claim 15, wherein the detection unit is operable to process identification data for the portable device received via the variable electromagnetic field.

17. The system of claim 15, wherein the computing unit is operable to determine one or more positions of the portable device based on the one or more radio signatures.

18. The system of claim 15, wherein the computing unit is operable to determine at least one of a speed and/or acceleration of the portable device from the one or more parameters, and wherein the control unit is operable to generate and output the signal based on the determined speed and/or acceleration.

19. The system of claim 15, wherein the signal comprises a control signal to control a function of a vehicle apparatus and/or an external apparatus associated with a vehicle.

20. The system of claim 15, wherein the portable device comprises one of a smart watch or a mobile telephone.

* * * * *